(12) United States Patent
Xu et al.

(10) Patent No.: US 12,219,954 B2
(45) Date of Patent: Feb. 11, 2025

(54) AQUEOUS DISPERSION OF A PESTICIDE AND POLYMER PARTICLES CONTAINING A COPOLYMERIZABLE SURFACTANT

(71) Applicant: BASF SE, Ludwigshafen (DE)

(72) Inventors: Wen Xu, Cary, NC (US); Michael Krayer, Charlotte, NC (US)

(73) Assignee: BASF SE, Ludwigshafen (DE)

( * ) Notice: Subject to any disclaimer, the term of this patent is extended or adjusted under 35 U.S.C. 154(b) by 185 days.

(21) Appl. No.: 15/534,158

(22) PCT Filed: Dec. 7, 2015

(86) PCT No.: PCT/EP2015/078818
§ 371 (c)(1),
(2) Date: Jun. 8, 2017

(87) PCT Pub. No.: WO2016/091801
PCT Pub. Date: Jun. 16, 2016

(65) Prior Publication Data
US 2019/0000077 A1 Jan. 3, 2019

Related U.S. Application Data

(60) Provisional application No. 62/089,266, filed on Dec. 9, 2014.

(30) Foreign Application Priority Data

Dec. 15, 2014 (EP) .................................... 14197983

(51) Int. Cl.
| | | |
|---|---|---|
| *A01N 25/10* | (2006.01) | |
| *A01N 25/00* | (2006.01) | |
| *A01N 25/04* | (2006.01) | |
| *A01N 25/30* | (2006.01) | |
| *A01N 43/36* | (2006.01) | |
| *A01N 47/24* | (2006.01) | |
| *A01N 53/00* | (2006.01) | |

(52) U.S. Cl.
CPC ............. *A01N 25/10* (2013.01); *A01N 25/00* (2013.01); *A01N 25/04* (2013.01); *A01N 25/30* (2013.01); *A01N 43/36* (2013.01); *A01N 47/24* (2013.01); *A01N 53/00* (2013.01)

(58) Field of Classification Search
CPC ........ A01N 25/30; A01N 25/00; A01N 25/04; A01N 25/10; A01N 37/42; A01N 43/36; A01N 47/24; A01N 53/00
See application file for complete search history.

(56) References Cited

U.S. PATENT DOCUMENTS

| | | | | |
|---|---|---|---|---|
| 4,939,283 | A | * 7/1990 | Yokota | ................ B01F 17/0057 |
| | | | | 558/186 |
| 5,905,114 | A | * 5/1999 | Baumstark | ............ C09D 133/06 |
| | | | | 524/801 |
| 2008/0103044 | A1 | 5/2008 | Tang et al. | |
| 2009/0156407 | A1 | 6/2009 | Zerrer et al. | |
| 2011/0015280 | A1 | 1/2011 | Nguyen Kim et al. | |
| 2014/0249272 | A1* | 9/2014 | Ogasawara | ........... C08F 220/14 |
| | | | | 524/836 |

FOREIGN PATENT DOCUMENTS

| | | |
|---|---|---|
| WO | WO2009021985 | 2/2009 |
| WO | WO2010086303 | 8/2010 |
| WO | WO2012017006 | 2/2012 |
| WO | WO2012069514 | 5/2012 |
| WO | WO2013156249 | 10/2013 |
| WO | WO2015172938 | 11/2015 |
| WO | WO2015186430 | 12/2015 |
| WO | WO2016008696 | 1/2016 |
| WO | WO2016016042 | 2/2016 |

OTHER PUBLICATIONS

Aramendia, E. et al. "Distribution of surfactants near . . . " Langmuir, 2003, 19(8), 3212-3221 (Year: 2003).*
Merriam-webster.com Definition of protect/protecting, no pagination, accessed Mar. 3, 2023.*
"Croda Crop Care Resource Centre—Formulator's Toolbox", Croda International Plc., May 10, 2014. (https://www.crodacropcare.com/en-gb/discovery-zone/the-formulators-toolbox).
Antonietti, et al., "90 Years of Polymer Latexes and Heterophase Polymerization: More vital than ever", Macromolecular Chemistry and Physics, vol. 204, Issue 2, Feb. 2003, p. 207-219.
Extended European Search Report for EP Patent Application No. 14197983.1, Issued on Apr. 28, 2015.
International Preliminary Report on Patentability for PCT Patent Application No. PCT/EP2015/078818, Issued on Jun. 22.
International Search Report and Written Opinion for PCT Patent Application No. PCT/EP2015/078818, Issued on Jan. 22, 2016, 10 pages.

* cited by examiner

*Primary Examiner* — Erin E Hirt
(74) *Attorney, Agent, or Firm* — MARSHALL, GERSTEIN & BORUN LLP

(57) ABSTRACT

The present invention relates to an aqueous dispersion comprising a water-insoluble pesticide and polymer particles, wherein the polymer particles comprise a copolymerizable surfactant in polymerized form; to a method of preparing the aqueous dispersion; a method of controlling phytopathogenic fungi and/or undesired plant growth and/or undesired insect or mite attack and/or for regulating the growth of plants; and seed containing said aqueous dispersion.

20 Claims, No Drawings

AQUEOUS DISPERSION OF A PESTICIDE AND POLYMER PARTICLES CONTAINING A COPOLYMERIZABLE SURFACTANT

This application is a National Stage application of International Application No. PCT/EP2015/078818, filed Dec. 7, 2015, which claims the benefit of U.S. Provisional Application No. 62/089,266 filed Dec. 9, 2014. This application also claims priority under 35 U.S.C. § 119 to European Patent Application No. 14197983.1, filed Dec. 15, 2014.

The present invention relates to an aqueous dispersion comprising a water-insoluble pesticide and polymer particles, wherein the polymer particles comprise an alkoxylated copolymerizable surfactant in polymerized form. Furthermore, the invention relates to a method of preparing the aqueous dispersion by contacting water, the pesticide, and the polymer particles. Further subject matter are a method of controlling phytopathogenic fungi and/or undesired plant growth and/or undesired insect or mite attack and/or for regulating the growth of plants, wherein the aqueous dispersion is allowed to act on the respective pests, their environment or the crop plants to be protected from the respective pest, on the soil and/or on undesired plants and/or on the crop plants and/or on their environment; and seed containing said aqueous dispersion. The present invention comprises combinations of preferred features with other preferred features.

Agrochemical compositions comprising polymer particles are known. WO 2010/086303 discloses seed dressing formulations comprising copolymers of various acrylate, acrylamide and alkyl acrylate monomers.

Object of the present invention was to further improve agrochemical formulations, for example with regard to their storage stability, their stability upon dilution, their rain fastness, their biological activity and to reduce the amount of pesticides that is necessary to combat the respective pests.

The object was achieved by an aqueous dispersion comprising a water-insoluble pesticide and polymer particles, wherein the polymer particles comprise an alkoxylated copolymerizable surfactant in polymerized form.

The aqueous dispersion usually relates to emulsions, suspensions and suspoemulsions, which are typical formulation types in the field of agrochemistry. In a preferred form the aqueous dispersion is a suspension. In another preferred form the aqueous dispersion is an emulsion. In yet another preferred form, the aqueous dispersion is a suspoemulsion.

In the case of suspensions, the aqueous dispersion usually comprises the water-insoluble pesticide in form of pesticide particles, which are homogenously suspended in a continuous aqueous phase, and the polymer particles, which are homogenously suspended in the continuous aqueous phase.

In the case of emulsions, the aqueous dispersion is usually an oil-in-water emulsion. The emulsion usually contains a water-immiscible solvent in form of emulsified droplets, which are homogenously emulsified in an aqueous continuous phase, and where the water-insoluble pesticide is present in dissolved form in the water-immiscible solvent. The emulsion further comprises the polymer particles, which are usually homogenously suspended in the continuous aqueous phase.

In the case of a suspoemulsion, the aqueous dispersion usually contains the water-insoluble pesticide in form of pesticide particles, and emulsified droplets which are homogenously emulsified in an aqueous continuous phase, and where the water-insoluble pesticide is also present in dissolved form in the water-immiscible solvent. The suspoemulsion further comprises the polymer particles, which are usually homogenously suspended in the continuous aqueous phase.

Other formulation types, however, such as capsule suspensions, dispersible concentrates, emulsifiably concentrates, flowable concentrates, water-in-oil emulsions, emulsifiable granules, emulsifiable gel, microemulsions and mixtures of the aforementioned formulation types, such as ZC (mixed formulation of capsule suspension and suspension concentrate), ZE (mixed formulation of capsule suspension and suspoemulsion) or ZW (mixed formulation of capsule suspension and oil-in-water emulsion) formulations are also within the scope of the invention.

The aqueous dispersion contains a water-insoluble pesticide. The term water-insoluble refers to pesticides that have solubility in water at 20° C. up to 10 g/l, preferably up to 1 g/l, and in particular up to 0.5 g/l.

The water-insoluble pesticide may be solid or liquid at room temperature and may furthermore be soluble in water-immiscible solvents.

The aqueous dispersion usually either comprises the water-insoluble pesticide in form of suspended pesticide particles, or in form of emulsified droplets, which comprise the water-insoluble pesticide in dissolved form.

The pesticide particles may be present in the form of crystalline or amorphous particles which are solid at 20° C.

The pesticide particles or emulsified droplets usually have a size distribution with an ×50 value from 0.1 to 10 μm, preferably from 0.2 μm to 5 μm and especially preferably from 0.5 μm to 2.5 μm. The size distribution can be determined by laser light diffraction of an aqueous dispersion comprising pesticide particles or emulsified droplets. The sample preparation, for example the dilution to the measuring concentration, will, in this measuring method, depend on the fineness and concentration of the pesticide particles and/or the emulsified droplets in the sample and on the apparatus used (for example Malvern Mastersizer), inter alia. The procedure should be developed for the system in question and is known to a person skilled in the art.

The term pesticide refers to at least one active substance selected from the group of the fungicides, insecticides, nematicides, herbicides, safeners, biopesticides and/or growth regulators. Preferred pesticides are fungicides, insecticides, herbicides and growth regulators. Mixtures of pesticides of two or more of the abovementioned classes may also be used. The skilled worker is familiar with such pesticides, which can be found, for example, in the Pesticide Manual, 16th Ed. (2013), The British Crop Protection Council, London. Suitable insecticides are insecticides from the class of the carbamates, organophosphates, organochlorine insecticides, phenylpyrazoles, pyrethroids, neonicotinoids, spinosins, avermectins, milbemycins, juvenile hormone analogs, alkyl halides, organotin compounds nereistoxin analogs, benzoylureas, diacylhydrazines, METI acarizides, and insecticides such as chloropicrin, pymetrozin, flonicamid, clofentezin, hexythiazox, etoxazole, diafenthiuron, propargite, tetradifon, chlorfenapyr, DNOC, buprofezine, cyromazine, amitraz, hydramethylnon, acequinocyl, fluacrypyrim, rotenone, or their derivatives. Suitable fungicides are fungicides from the classes of dinitroanilines, allylamines, anilinopyrimidines, antibiotics, aromatic hydrocarbons, benzenesulfonamides, benzimidazoles, benzisothiazoles, benzophenones, benzothiadiazoles, benzotriazines, benzyl carbamates, carbamates, carboxamides, carboxylic acid diamides, chloronitriles cyanoacetamide oximes, cyanoimidazoles, cyclopropanecarboxamides, dicarboximides, dihydrodioxazines, dinitrophenyl crotonates, dithiocarbamates, dithiolanes, ethylphosphonates, ethylaminothiazolecarboxamides, guanidines, hydroxy-(2-amino)pyrimidines, hydroxyanilides, imidazoles, imidazolinones, inorganic substances, isobenzofuranones, methoxyacrylates, methoxycarbamates, morpholines, N-phenylcarbamates, oxazolidinediones, oximinoacetates, oximinoacetamides, peptidylpyrimidine nucleosides, phenylacetamides, phenylamides, phenylpyrroles, phenylureas, phosphonates, phosphorothiolates, phthalamic acids, phthalimides, piperazines, piperidines, propionamides, pyridazinones, pyridines, pyridinylmethylbenzamides, pyrimidinamines, pyrimidines, pyrimidinonehydrazones, pyrroloquinolinones, quinazolinones, quinolines, quinones, sulfamides, sulfamoyltriazoles, thiazolecarboxamides, thiocarbamates, thiophanates, thiophenecarboxamides, toluamides, triphenyltin compounds, triazines, triazoles. Suitable herbicides are herbicides from the classes of the acetamides, amides, aryloxyphenoxypropionates, benzamides, benzofuran, benzoic acids, benzothiadiazinones, bipyridylium, carbamates, chloroacetamides, chlorocarboxylic acids, cyclohexanediones, dinitroanilines, dinitrophenol, diphenyl ether, glycines, imidazolinones, isoxazoles, isoxazolidinones, nitriles, N-phenylphthalimides, oxadiazoles, oxazolidinediones, oxyacetamides, phenoxycarboxylic acids, phenylcarbamates, phenylpyrazoles, phenylpyrazolines, phenylpyridazines, phosphinic acids, phosphoroamidates, phosphorodithioates, phthalamates, pyrazoles, pyridazinones, pyridines, pyridinecarboxylic acids, pyridinecarboxamides, pyrimidinediones, pyrimidinyl(thio)benzoates, quinolinecarboxylic acids, semicarbazones, sulfonylaminocarbonyltriazolinones, sulfonylureas, tetrazolinones, thiadiazoles, thiocarbamates, triazines, triazinones, triazoles, triazolinones, triazolocarboxamides, triazolopyrimidines, triketones, uracils, ureas.

Usually, the aqueous dispersion comprises at least 5% by weight, preferably at least 10% by weight, especially preferably at least 20% by weight of the water-insoluble pesticide, in each case based on the total weight of the aqueous dispersion.

The aqueous dispersion may further comprise a water-soluble pesticide in addition to the water-insoluble pesticide, which is dissolved in the aqueous continuous phase of the aqueous dispersion. Preferably, the water-soluble pesticide has a solubility in water at 20° C. of more than 10 g/l, more preferably 20 g/l or higher, and most preferably 50 g/l or higher.

The aqueous dispersion may comprise from 0.1% to 50% by weight, preferably from 0.5 to 40% by weight, and most preferably from 1 to 30% by weight of the water-soluble pesticide.

The aqueous dispersion may contain a water-immiscible solvent that usually contains the water-insoluble pesticide. The water-immiscible solvent may have a solubility in water at 20° C. of up to 50 g/l, preferably of up to 20 g/l, and in particular of up to 5 g/l.

Suitable examples for water-immiscible solvents are
a hydrocarbon solvent such a an aliphatic, cyclic and aromatic hydrocarbons (e. g. toluene, xylene, paraffin, tetrahydronaphthalene, alkylated naphthalenes or their derivatives, mineral oil fractions of medium to high boiling point (such as kerosene, diesel oil, coal tar oils));
a vegetable oil such as corn oil, rapeseed oil;
benzyl acetate;
a fatty acid ester such as $C_1$-$C_{10}$-alkylester of a $C_{10}$-$C_{22}$-fatty acid; or
methyl- or ethyl esters of vegetable oils such as rapeseed oil methyl ester or corn oil methyl ester.

Mixtures of aforementioned solvents are also possible. Preferred solvents are aromatic hydrocarbons or benzyl acetate.

Suitable water-immiscible solvent are aromatic hydrocarbons. Aromatic hydrocarbons are compounds which consist of carbon and hydrogen and which comprise aromatic groups. Preferred are aromatic hydrocarbons or their mixtures with an initial boiling point of at least 160° C., preferably at least 180° C. Examples of aromatic hydrocarbons are benzene, toluene, o-, m- or p-xylene, naphthalene, biphenyl, o- or m-terphenyl, aromatic hydrocarbons which are mono- or polysubstituted by $C_1$-$C_{20}$-alkyl, such as ethyl benzene, dodecylbenzene, tetradecylbenzene, hexadecylbenzene, methylnaphthalene, diisopropylnaphthalene, hexylnaphthalene or decylnaphthalene. Others which are suitable are aromatic hydrocarbon mixtures with an initial boiling point of at least 160° C. Such compounds are for example commercially available from ExxonMobil or BP under the following trade names: Solvesso® 100, Solvesso® 150, Solvesso® 200, Solvesso® 150ND, Solvesso® 200N D, Aromatic® 150, Aromatic® 200, Hydrosol® A 200, Hydrosol® A 230/270, Caromax® 20, Caromax® 28, Aromat® K 150, Aromat® K 200, Shellsol® A 150, Shellsol® A 100, Fin® FAS-TX 150, Fin® FAS-TX 200. Preferred aromatic hydrocarbons are aromatic hydrocarbon mixtures with an initial boiling point of at least 160° C., preferably at least 180° C. Mixtures of the above aromatic hydrocarbons are also possible.

Usually, the aqueous dispersion (preferably the emulsion) comprises from 5 to 60% by weight, preferably from 10 to 55% by weight, especially preferably from 20 to 45% by weight of the water-immiscible solvent, in each case based on the total weight of the aqueous dispersion.

The concentration of the water-insoluble pesticide in the water-immiscible solvent may be at least 5% by weight, preferably at least 10% by weight, and most preferably at least 30% by weight of the water-immiscible solvent.

In the case that the aqueous dispersion is a suspension, said aqueous dispersion contains less than 10% by weight, preferably less than 1% by weight and most preferably less than 0.5% by weight of the water-immiscible solvent.

The aqueous dispersion may comprise a water-soluble solvent. The water-soluble solvent may have a solubility in water at 20° C. of more than 50 g/l, preferably of more than 100 g/l. Usually, the aqueous dispersion comprises less than 10% by weight, preferably less than 3% by weight, especially preferably less than 1% by weight of the water-soluble solvent, in each case based on the total weight of the aqueous dispersion. In one form the aqueous dispersion is essentially free of a water-soluble solvent.

The aqueous dispersion comprises water. The aqueous dispersion may comprise at least 5% by weight, preferably at least 10% by weight and especially preferably at least 15% by weight of water based on the total weight of the aqueous dispersion. The aqueous dispersion may comprise from 20 to 85% by weight, preferably from 30 to 75% by weight and especially preferably from 35 to 70% by weight of water, based on the total weight of the aqueous dispersion.

The aqueous dispersion further contains polymer particles. The polymer particles comprise an alkoxylated copolymerizable surfactant in polymerized form.

The term alkoxylated copolymerizable surfactant usually relates to compounds that have a reactive group, a scaffold, at least one alkoxylate moiety and a hydrophobic anchor moiety.

The reactive group is able to participate in a polymerization reaction, thereby forming a covalent bond to other monomers in the polymer molecule.

Usually, the reactive group is selected from unsaturated aliphatic hydrocarbons that are preferably connected via a single bond, an ether, a ketone or an ester to the scaffold of the copolymerizable surfactant.

Examples for reactive groups are vinyl, allyl, 1-propenyl, 1-butenyl, 2-butenyl, isobutenyl, and 3-butenyl.

Preferably, the reactive group is selected from vinyl, allyl and 1-propenyl, preferably from allyl and 1-propenyl and most preferably from allyl.

The scaffold of the copolymerizable surfactant may be covalently linked to the reactive group, to at least one alkoxylate and to a hydrophobic anchor. The scaffold may be selected from aliphatic and aromatic $C_2$ to $C_{10}$ hydrocarbons and polyols comprising from 2 to 10 carbon atoms and from 2 to 10 hydroxyl groups.

Preferably, the scaffold is selected from aliphatic and aromatic $C_3$ to $C_8$ hydrocarbons and polyols comprising from 2 to 6 carbon atoms and from 2 to 6 hydroxyl groups.

More preferably, the scaffold is selected from aliphatic and aromatic $C_3$ to $C_6$ hydrocarbons and polyols comprising from 2 to 4 carbon atoms and from 2 to 4 hydroxyl groups.

Most preferably, the scaffold is selected from aromatic $C_5$ to $C_6$ hydrocarbons and polyols comprising 3 carbon atoms and 3 hydroxyl groups.

In one example the scaffold is selected from pentadienyl, phenyl and glycerol, preferably from phenyl and glycerol.

The copolymerizable surfactant is alkoxylated. The copolymerizable surfactant may have at least one alkoxylate moiety that is covalently linked to the scaffold.

Herein, the term alkoxylate usually refers to homo and copolymers of alkylene oxide moieties containing 2, 3 or 4 carbon atoms, such as polyethylene oxide, polypropylene oxide or polybutylene oxide.

Preferably, the alkoxylate is a polyethylene oxide or a polypropylene oxide. More preferably, the alkoxylate is a polyethylene oxide.

The repeat index of the alkoxylate may be from 1 to 1000, preferably from 1 to 100, more preferably from 3 to 50 and most preferably from 5 to 15. The term repeat index refers to the number of alkylene oxide repetition units.

The scaffold may also be linked to a hydrophobic anchor, which is usually a $C_5$ to $C_{20}$ hydrocarbon. Preferably, the hydrophobic anchor is a $C_5$ to $C_{15}$ hydrocarbon, more preferably a $C_9$ to $C_{15}$ hydrocarbon. Most preferably, the hydrophobic anchor is a $C_{10}$ to $C_{14}$ hydrocarbon.

The hydrophobic anchor may be aliphatic, aromatic or contain a mixture of aromatic and aliphatic moieties. In one embodiment, the hydrophobic anchor is aliphatic. In another embodiment, the hydrophobic anchor contains a mixture of aromatic and aliphatic moieties.

Examples of hydrophobic anchors are nonyl, decyl, undecyl, dodecyl, tridecyl, tetradecyl, pentadecyl, hexyl-phenyl, heptyl-phenyl, octyl-phenyl, nonyl-phenyl, decyl-phenyl and unecyl-phenyl moieties, with the alkyl chain both in branched and linear conformation.

In one embodiment, the hydrophobic anchor is a $C_1$-$C_{14}$-alkyl-phenyl, preferably a $C_4$-$C_{12}$-alkylphenyl, more preferably a $C_5$-$C_{11}$-alkyl-phenyl, most preferably a $C_7$-$C_{11}$-alkyl-phenyl, and in particular a $C_9$-alkyl-phenyl.

The alkoxylated copolymerizable surfactant may further contain an acidic moiety, such as a carboxylic acid, a sulfonic acid or a phosphonic acid moiety in protonated form or as a salt of an organic or inorganic kation.

For example, the copolymerizable surfactant may comprise a reactive group selected from an allyl and 1-propenyl, a scaffold selected from phenyl and glycerol, at least one polyethylene oxide moiety with a repeat index from 3 to 50, a $C_5$ to $C_{15}$ hydrocarbon as hydrophobic anchor and a sulfonic acid moiety.

In one embodiment the copolymerizable surfactant comprises a reactive group selected from 1-propenyl and allyl, a scaffold selected from aliphatic and aromatic $C_2$ to $C_{10}$ hydrocarbons, at least one polyethelyene oxide moiety with a repeat index from 1 to 100, a $C_5$ to $C_{15}$ hydrocarbon as hydrophobic anchor and optionally a sulfonic acid moiety.

In a preferred form, the copolymerizable surfactant comprises a reactive group selected from 1-propenyl and allyl, a scaffold selected from aliphatic and aromatic $C_3$ to $C_6$ hydrocarbons, at least one polyethelyene oxide moiety with a repeat index from 3 to 50, an aliphatic $C_9$ to $C_{15}$ hydrocarbon as hydrophobic anchor and optionally a sulfonic acid moiety.

In a more preferred form, the copolymerizable surfactant comprises a reactive group selected from 1-propenyl and allyl, a phenyl scaffold, at least one polyethelyene oxide moiety with a repeat index from 3 to 50, an aliphatic $C_9$-hydrocarbon as hydrophobic anchor and a sulfonic acid moiety.

In another embodiment the copolymerizable surfactant comprises a reactive group selected from an allyl and a vinyl ether, an allyl ester and a vinyl ester, a scaffold selected from polyols comprising from 2 to 6 carbon atoms and from 2 to 6 hydroxyl groups, at least one polyethelyene oxide moiety with a repeat index from 1 to 100, a $C_5$ to $C_{20}$ hydrocarbon as hydrophobic anchor and optionally a sulfonic acid moiety.

In a preferred form, the copolymerizable surfactant comprises a reactive group selected from an allyl ether and an allyl ester, a scaffold selected from polyols comprising from 2 to 4 carbon atoms and from 2 to 4 hydroxyl groups, at least one polyethelyene oxide moiety with a repeat unit from 3 to 50, a hydrophobic anchor selected from $C_5$ to $C_{20}$ hydrocarbons as hydrophobic anchor and a sulfonic acid moiety.

In a more preferred form, the copolymerizable surfactant comprises a reactive group selected from an allyl ether and an allyl ester, a glycerol scaffold, at least one polyethelyene oxide moiety with a repeat index from 5 to 15, a hydrophobic anchor selected from aliphatic $C_{10}$ to $C_{14}$ hydrocarbons and $C_7$ to $C_{11}$ alkyl-phenyl and a sulfonic acid moiety.

In one embodiment the copolymerizable surfactant is a compound according to formula (I)

$$R^1-O-(AO')_n-\left[CH_2-CH\begin{matrix}CH_2-O-\left[\begin{matrix}O\\\|\end{matrix}\right]_y-[CH_2]_x\\|\\O\end{matrix}\begin{matrix}R^2\ R^3\\|\ |\end{matrix}\right]_z-(AO)_m-X \quad (I)$$

wherein $R^1$ is a $C_5$-$C_{20}$ hydrocarbon group;

$R^2$ and $R^3$ are each independently a hydrogen atom or methyl;

AO and AO' are each independently an alkylene oxide group having 2 to 4 carbon atoms;

X is H or $SO_3^-$;

the index x ranges from 0 to 12;

the index y is either 0 or 1;

the index z ranges from 1 to 10;
the index m ranges from 1 to 1000; and
the index n ranges from 0 to 1000.

In one embodiment, the index n in formula (I) is 0. In another embodiment, the index y in formula (I) is 1. In yet another embodiment, the index x in formula (I) is 1.

The indices m, and n, in formula (I) may be independently from one another from 1 to 100, preferably from 3 to 50, and more preferably from 5 to 15.

In another embodiment, $R^2$, and $R^3$, in formula (I) are both hydrogen.

In one embodiment, AO, and AO', in formula (I) are each independently an ethylene oxide group. In another embodiment, AO, and AO', in formula (I) are each independently a propylene oxide group.

In a particularly preferred form, the copolymerizable surfactant is a compound according to formula (Ia)

$$H_2C\diagup\diagdown O\diagdown\diagup\diagdown O\diagup\diagdown O\diagup\diagdown_{R^4}\;\;(Ia)$$

wherein
$R^4$ is $C_9$-$C_{15}$ alkyl or $C_7$-$C_{11}$ alkyl-phenyl,
X is H or $SO_3^-$, and
the index o is from 3 to 50.

Preferably, in formula (Ia), the residue $R^4$ is a $C_9$-$C_{15}$ alkyl (more preferably a $C_{10}$-$C_{14}$ alkyl), X is $SO_3^-$ and the index o is from 5 to 15.

In one example, in formula (Ia), $R^4$ is $C_9$-$C_{15}$ alkyl, X is $SO_3^-$, and o ranges from 3 to 50. In another example, $R^4$ is $C_{10}$-$C_{14}$ alkyl, X is $SO_3^-$, and the index o is from 5 to 15.

In another embodiment, the copolymerizable surfactant is a compound according to formula (II)

$$(II)$$

wherein
$R^5$ is a $C_5$-$C_{20}$ hydrocarbon group;
AO is an alkylene oxide group having 2 to 4 carbon atoms;
X is H or $SO_3^-$; and
the index n ranges from 1 to 1000.

In one embodiment, AO in formula (II) is ethylene oxide. In another embodiment, AO in formula (II) is propylene oxide.

In one embodiment, the index n in formula (II) may be from 1 to 100, preferably from 3 to 50.

In one embodiment, $R^5$ may be an aliphatic alkyl residue, preferably a $C_6$-$C_{20}$ alkyl, more preferably a $C_9$-$C_{16}$ alkyl.

Alkoxylated copolymerizable surfactants of the above types, e.g. according to formulae (I), (Ia), or (II), are commercially available.

The alkoxylated copolymerizable surfactant is present in the polymer particles in polymerized form as monomer (I).

The polymer particles usually comprise from 0.1 to 20% by weight of the monomer (I), preferably from 0.1 to 10% by weight, and most preferably from 0.5 to 5% by weight referred to the total amount of the monomers.

In a preferred embodiment, the polymer particles comprise from 0.1 to 10% by weight of the monomer (I), wherein $R^4$ in formula (Ia) is $C_9$-$C_{15}$ alkyl, X is $SO_3^-$, and the index o ranges from 3 to 50.

In a more preferred embodiment, the polymer particles comprise from 0.5 to 5% by weight of the monomer (I), wherein $R^4$ in formula (Ia) is $C_{10}$-$C_{14}$ alkyl, X is $SO_3^-$, and n ranges from 5 to 15.

The polymer particles may further comprise $C_2$-$C_{12}$ alkyl (meth)acrylate as monomer (II) in polymerized form. Preferably, the $C_2$-$C_{12}$ alkyl (meth)acrylate is a $C_2$-$C_8$ alkyl (meth)acrylate, more preferably $C_2$-$C_6$ alkyl (meth)acrylate.

Herein, the abbreviation (meth)acrylate relates to methacrylate and/or acrylate.

Examples of suitable $C_2$-$C_{12}$ alkyl (meth)acrylates are ethyl acrylate, propyl acrylate, butyl acrylate, pentyl acrylate, hexyl acrylate, heptyl acrylate, octyl acrylate, ethyl methacrylate, propyl methacrylate, butyl methacrylate, pentyl methacrylate, hexyl methacrylate, heptyl methacrylate and octyl methacrylate. In a particularly preferred example, the $C_2$-$C_{12}$ alkyl (meth)acrylate is butyl acrylate.

The polymer particles may comprise at least 10% by weight of the monomer (II) in polymerized form, preferably at least 20% by weight and most preferably at least 30% by weight referred to the total amount of the monomers.

Furthermore, the polymer particles may contain methyl (meth)acrylate as monomer (III) in polymerized form. Typically, the polymer particles contain at least 20% by weight, preferably at least 30% by weight and most preferably at least 40% by weight of monomer (III), based on the total amount of the monomers.

Also, the polymer particles may contain (meth)acrylamide and (meth)acrylic acid as monomer (IV) in polymerized form. The weight ratio of meth)acrylamide and (meth)acrylic acid may range from 10:1 to 1:10, preferably from 5:1 to 1:5 and most preferably from 1:1 to 1:2.

The total amount of monomer (IV) in the polymer particles typically ranges from 0.1 to 10% by weight, preferably from 0.5 to 5% by weight and most preferably from 0.5 to 2% by weight based on the total amount of the monomers.

Usually the polymer particles comprise from 0.1 to 20 wt % of monomer (I) and at least 10 wt % of monomer (II) in polymerized form based on the total amount of the monomers.

In a preferred form of the invention, the polymer particles comprise from 0.1 to 20 wt % of monomer (I) and at least 10 wt % of monomer (II) and at least 20 wt % of monomer (III) in polymerized form based on the total amount of the monomers.

In a more preferred form of the invention, the polymer particles comprise from 0.1 to 20 wt % of monomer (I) and at least 10 wt % of monomer (II), at least 20 wt % of monomer (III) and from 0.1 to 10 wt % of monomer (IV) in polymerized form based on the total amount of the monomers.

In a most preferred form of the invention, the polymer particles comprise from 0.1 to 10 wt % of monomer (I), at least 20 wt % of monomer (II), at least 20 wt % of monomer (III) and from 0.5 to 5 wt % of monomer (IV) based on the total amount of the monomers and the ratio of the (meth) acrylamide and (meth)acrylic acid is from 10:1 to 1:10.

In an especially preferred form of the invention, the polymer particles comprise from 0.5 to 5 wt % of monomer (I), at least 30 wt % of monomer (II), at least 40 wt % of monomer (III) and from 0.5 to 2 wt % of monomer (IV) based on the total amount of the monomers and the ratio of the (meth)acrylamide and (meth)acrylic acid is from 5:1 to 1:5.

In particular, the polymer particles comprise from 0.5 to 5 wt % of monomer (I), at least 30 wt % of monomer (II), at least 40 wt % of monomer (III) and from 0.5 to 2 wt % of monomer (IV) based on the total amount of the monomers and the ratio of the (meth)acrylamide and (meth)acrylic acid is from 1:1 to 1:2.

In one example, the polymer particles comprise the monomers
(I) in form of the alkoxylated copolymerizable surfactant;
(II) $C_2$-$C_{12}$ alkyl (meth)acrylate;
(III) methyl (meth)acrylate; and
(IV) (meth)acrylamide and (meth)acrylic acid
in polymerized form.

In another example, the polymer particles comprise the monomers
(I) in form of the alkoxylated copolymerizable surfactant according to formulae (I), or (II);
(II) $C_2$-$C_{12}$ alkyl (meth)acrylate;
(III) methyl (meth)acrylate; and
(IV) (meth)acrylamide and (meth)acrylic acid
in polymerized form.

In another example, the polymer particles comprise the monomers
(I) in form of the alkoxylated copolymerizable surfactant according to formula (I);
(II) $C_2$-$C_{12}$ alkyl (meth)acrylate;
(III) methyl (meth)acrylate; and
(IV) (meth)acrylamide and (meth)acrylic acid
in polymerized form.

In yet another example, the polymer particles comprise the monomers
(I) in form of the alkoxylate copolymerizable surfactant according to formula (Ia);
(II) $C_2$-$C_{12}$ alkyl (meth)acrylate;
(III) methyl (meth)acrylate; and
(IV) (meth)acrylamide and (meth)acrylic acid
in polymerized form.

In yet another example, the polymer particles comprise the monomers
(I) in form of the alkoxylated copolymerizable surfactant according to formula (Ia), where $R^4$ is $C_9$-$C_{15}$ alkyl, X is $SO_3^-$, the index o ranges from 5 to 15;
(II) $C_2$-$C_{12}$ alkyl (meth)acrylate;
(III) methyl (meth)acrylate; and
(IV) (meth)acrylamide and (meth)acrylic acid
in polymerized form.

In yet another example the polymer particles comprise the monomers
(I) in form of the alkoxylated copolymerizable surfactant according to formula (Ia), where $R^4$ is $C_{10}$-$C_{14}$ alkyl, X is $SO_3^-$, the index o ranges from 5 to 15;
(II) $C_2$-$C_5$ alkyl (meth)acrylate;
(III) methyl (meth)acrylate; and
(IV) (meth)acrylamide and (meth)acrylic acid
in polymerized form.

In yet another example the polymer particles comprise the monomers
(I) in form of the alkoxylated copolymerizable surfactant according to formula (Ia), where $R^4$ is $C_{10}$-$C_{14}$ alkyl, X is $SO_3^-$, the index o ranges from 5 to 15; and
(II) butyl (meth)acrylate; and
(III) methyl (meth)acrylate; and
(IV) (meth)acrylamide and (meth)acrylic acid
in polymerized form.

In yet another example the polymer particles comprise the monomers
(I) in form of the alkoxylated copolymerizable surfactant according to formula (Ia), where $R^4$ is $C_{10}$-$C_{14}$ alkyl, X is $SO_3^-$, the index o ranges from 5 to 15;
(II) butyl acrylate;
(III) methyl methacrylate; and
(IV) acrylamide and acrylic acid
in polymerized form, wherein the weight ratio of the acrylamide and the acrylic acid is from 5:1 to 1:5.

The polymer particles may comprise at least one (e.g. one to five) further monomer (monomer (V)) in polymerized form in addition to the monomers (I) to (IV) listed above.

Suitable further monomers (V) include, for example, vinyl acetate, styrene, acrylonitrile, and mixtures thereof. Further examples include vinyltoluenes; conjugated dienes (e.g., 1,3-butadiene and isoprene); α,β-monoethylenically unsaturated mono- and dicarboxylic acids or anhydrides thereof (e.g., itaconic acid, crotonic acid, dimethacrylic acid, allylacetic acid, vinylacetic acid maleic acid, fumaric acid, mesaconic acid, methylenemalonic acid, citraconic acid, maleic anhydride, itaconic anhydride, and methylmalonic anhydride); esters of maleic acid, fumaric acid, or itaconic acid, with $C_1$-$C_{12}$, $C_1$-$C_8$, or $C_1$-$C_4$ alkanols such as dimethyl maleate and n-butyl maleate); N-tert-butylacrylamide, and N-methyl (meth)acrylamide); diacetone acrylamide; (meth)acrylonitrile; vinyl and vinylidene halides (e.g., vinyl chloride and vinylidene chloride); vinyl esters of $C_1$-$C_{18}$ mono- or dicarboxylic acids (e.g., vinyl propionate, vinyl n-butyrate, vinyl laurate and vinyl stearate); $C_1$-$C_4$ hydroxyalkyl esters of $C_3$-$C_6$ mono- or dicarboxylic acids, especially of acrylic acid, methacrylic acid or maleic acid, or their derivatives alkoxylated with from 2 to 50 moles of ethylene oxide, propylene oxide, butylene oxide or mixtures thereof, or esters of these acids with $C_1$-$C_{18}$ alcohols alkoxylated with from 2 to 50 mol of ethylene oxide, propylene oxide, butylene oxide or mixtures thereof (e.g., hydroxyethyl (meth)acrylate, hydroxypropyl (meth)acrylate, and methylpolyglycol acrylate); silane monomers; and monomers containing glycidyl groups (e.g., glycidyl methacrylate).

Other examples of monomer (V) that can be used include linear 1-olefins, branched-chain 1-olefins or cyclic olefins (e.g., ethene, propene, butene, isobutene, pentene, cyclopentene, hexene, and cyclohexene); vinyl and allyl alkyl ethers having 1 to 40 carbon atoms in the alkyl radical, wherein the alkyl radical can possibly carry further substituents such as a hydroxyl group, an amino or dialkylamino group, or one or more alkoxylated groups (e.g., methyl vinyl ether, ethyl vinyl ether, propyl vinyl ether, isobutyl vinyl ether, 2-ethylhexyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-n-butylamino)ethyl vinyl ether, methyldiglycol vinyl ether, and the corresponding allyl ethers); sulfo-functional monomers (e.g., allylsulfonic acid, methallylsulfonic acid, styrenesulfonate, allyloxybenzenesulfonic acid, 2-acrylamido-2-methylpropanesulfonic acid, and their corresponding alkali metal or ammonium salts, sulfopropyl acrylate and sulfopropyl methacrylate); vinylphosphonic acid, dimethyl vinylphosphonate, and other phosphorus monomers; alkylaminoalkyl (meth)acrylates or alkylaminoalkyl(meth)acrylamides or quaternization products thereof (e.g., 2-(N,N-dimethylamino)ethyl (meth)acrylate, 3-(N,N- dimethylamino)propyl (meth)acrylate, 2-(N,N,N-trimethylammonium)ethyl (meth)acrylate chloride, 2-dimethylaminoethyl(meth)acrylamide, 3-dimethylaminopropyl(meth)acrylamide, and 3-trimethylammoniumpropyl (meth)acrylamide chloride); allyl esters of $C_1$-$C_{30}$ monocarboxylic acids; N-vinyl compounds (e.g., N-vinylformamide, N-vinyl-N-methylformamide, N-vinylpyrrolidone, N-vinylimidazole, 1-vinyl-2-methylimidazole, 1-vinyl-2-methylimidazoline, N-vinylcaprolactam, vinylcarbazole, 2-vinyl pyridine, and 4-vinylpyridine).

The monomer (V) used may include cross-linking monomers, such as divinylbenzene; 1,4-butanediol diacrylate; monomers containing 1,3-diketo groups (e.g., acetoacetoxyethyl(meth)acrylate or diacetonacrylamide); and monomers containing urea groups (e.g., ureidoethyl (meth)acrylate, acrylamidoglycolic acid, and methacrylamidoglycolate methyl ether); and silane crosslinkers (e.g., 3-methacryloxypropyl trimethoxysilane and 3-mercaptopropyl trimethoxysilane). Additional examples of crosslinkers include N-alkylolamides of α,β-monoethylenically unsaturated carboxylic acids having 3 to 10 carbon atoms and esters thereof with alcohols having 1 to 4 carbon atoms (e.g., N-methylolacrylamide and N-methylolmethacrylamide); glyoxal based crosslinkers; monomers containing two vinyl radicals; monomers containing two vinylidene radicals; and monomers containing two alkenyl radicals.

Exemplary crosslinking monomers include diesters or triesters of dihydric and trihydric alcohols with α,β-monoethylenically unsaturated monocarboxylic acids (e.g., di(meth)acrylates, tri(meth)acrylates), of which in turn acrylic acid and methacrylic acid can be employed. Examples of such monomers containing two non-conjugated ethylenically unsaturated double bonds are alkylene glycol diacrylates and dimethacrylates, such as ethylene glycol diacrylate, 1,3-butylene glycol diacrylate, 1,4-butylene glycol diacrylate and propylene glycol diacrylate, vinyl methacrylate, vinyl acrylate, allyl methacrylate, allyl acrylate, diallyl maleate, diallyl fumarate and methylenebisacrylamide. The crosslinking monomers when used in the copolymer can be present in an amount of from 0.2% to 5% by weight based on the weight of the total monomer. Usually, the polymer is free of crosslinking monomers.

The polymer particles described herein can be prepared by polymerizing the monomers (e.g. monomer (I), and optionally monomers (II), (III) (IV) and (V)) using free-radical emulsion polymerization. The emulsion polymerization temperature is generally from 30° C. to 95° C. or from 75° C. to 90° C. The polymerization medium can include water alone or a mixture of water and water-miscible liquids, such as methanol. In some embodiments, water is used alone. The emulsion polymerization can be carried out either as a batch, semi-batch, or continuous process. Typically, a semi-batch process is used. In some embodiments, a portion of the monomers can be heated to the polymerization temperature and partially polymerized, and the remainder of the polymerization batch can be subsequently fed to the polymerization zone continuously, in steps or with superposition of a concentration gradient. Alternatively, other heterophase polymerization methods can be used, such as mini-emulsion polymerization. Further examples of polymerization methods include those described, for example, in Antonietti et al., *Macromol. Chem. Phys.*, 204:207-219 (2003), which is incorporated herein by reference.

The free-radical emulsion polymerization can be carried out in the presence of a free-radical polymerization initiator. The free-radical polymerization initiators that can be used in the process are all those which are capable of initiating a free-radical aqueous emulsion polymerization including alkali metal peroxydisulfates and $H_2O_2$, or azo-compounds. Combined systems can also be used comprising at least one organic reducing agent and at least one peroxide and/or hydro peroxide, e.g., tert-butyl hydro peroxide and the sodium metal salt of hydroxymethanesulfinic acid or hydrogen peroxide and ascorbic acid. Combined systems can also be used additionally containing a small amount of a metal compound which is soluble in the polymerization medium and whose metallic component can exist in more than one oxidation state, e.g., ascorbic acid/iron(II) sulfate/hydrogen peroxide, where ascorbic acid can be replaced by the sodium metal salt of hydroxymethanesulfinic acid, sodium sulfite, sodium hydrogen sulfite or sodium metal bisulfite and hydrogen peroxide can be replaced by tert-butyl hydro peroxide or alkali metal peroxydisulfates and/or ammonium peroxydisulfates. In the combined systems, the carbohydrate derived compound can also be used as the reducing component. In general, the amount of free-radical initiator systems employed can be from 0.1 to 2%, based on the total amount of the monomers to be polymerized. In some embodiments, the initiators are ammonium and/or alkali metal peroxydisulfates (e.g., sodium persulfate), alone or as a constituent of combined systems. The manner in which the free-radical initiator system is added to the polymerization reactor during the free-radical aqueous emulsion polymerization is not critical. It can either all be introduced into the polymerization reactor at the beginning, or added continuously or stepwise as it is consumed during the free-radical aqueous emulsion polymerization. In detail, this depends in a manner known to an average person skilled in the art both from the chemical nature of the initiator system and on the polymerization temperature. In some embodiments, some is introduced at the beginning and the remainder is added to the polymerization zone as it is consumed. It is also possible to carry out the free-radical aqueous emulsion polymerization under superatmospheric or reduced pressure.

One or more polymerization surfactants can be included to improve certain properties of the dispersion, including particle stability. For example, sodium laureth sulfate, sodium hexametaphosphate, tetrasodium pyrophosphate, tetrapotassium pyrophosphate, and alkylbenzene sulfonic acid or sulfonate surfactants could be used. Examples of commercially available surfactants include CALFOAM ES-303 (Pilot Chemical Company; Cincinnati, OH); DOWFAX 2A1, an alkyldiphenyloxide disulfonate surfactant available from Dow Chemical Company (Midland, MI); and ALCOSPERSE 149, a sodium polyacrylate surfactant available from Akzo Nobel Surface Chemistry (Chicago, IL). In general, the amount of polymerization surfactants employed can be from 0.01 to 5%, based on the total amount of the monomers to be polymerized. The polymerization surfactants are usually not able to react during the polymerization reaction and thus do not form any covalent bonds to the polymer particles.

In addition, in order to adjust the film-forming properties of the polymer, the polymer particles may also comprise what are known as film-forming consolidating agents (plasticizers), examples being ethylene glycol, propylene glycol, butylene glycol, hexylene glycol, alkyl ethers and alkyl ether esters of glycols and polyglycols, e.g., diethylene glycol monoethyl ether, diethylene glycol monoethyl ether acetate, diethylene glycol monobutyl ether, hexylene glycol diacetate, propylene glycol monoethyl ether, monophenyl ether, monobutyl ether and monopropyl ether, dipropylene glycol monomethyl ether, and mono-n-butyl ether, tripropylene glycol mono-n-butyl ether, and the acetates of said monoalkyl ethers, such as butoxybutyl acetate, and also alkyl esters of aliphatic mono- and dicarboxylic acids, such as Texanol® from Eastman, or technical-grade mixtures of dibutyl esters of succinic, glutaric and adipic acid. Film-forming auxiliaries are customarily employed in amounts of from 0.1 to 20 percent by weight, based on the polymer. In one form the polymer particles comprise less than 5 wt %, preferably less than 2 wt %, and in particular less than 0.3 wt % of plasticizers. Preferably, the polymer particles are free of plasticizers.

Small amounts (e.g., from 0.01 to 2% by weight based on the total monomer weight) of molecular weight regulators, such as a mercaptan, can optionally be used. Such substances are preferably added to the polymerization zone in a mixture with the monomers to be polymerized and are considered part of the total amount of unsaturated monomers used in the copolymer.

The average molecular weight of the polymer is usually from 10.000 to 5.000.000 Da, preferably from 100.000 to 1.000.000 Da, and in particular from 300.000 to 800.000 Da.

The glass transition temperature ($T_g$) of the polymer particles is usually from −10 to 30° C., more preferably from 0 to +20° C., and in particular from 5 to 15° C. The glass transition temperature of the polymers may be determined by differential scanning calorimeter (DSC), e.g. by the following procedure: All samples may be dried at 110° C. for one hour to eliminate the effect of water/solvent on $T_g$ of copolymers. The DSC sample size may be about 10-15 mg. The measurement is usually carried out from −100° C. to 100° C. at 20° C./min under $N_2$-atmosphere. The $T_g$ may be determined by midpoint of the transition region.

The glass transition temperature typically depends on the monomer composition, and the average molecular weight of the polymer particles. The skilled person is able to manipulate $T_g$ by variation of the monomer concentrations, and the average molecular weight of the polymer. Usually, an increase of the concentration of the alkoxylated copolymerizable surfactant results in a decrease of $T_g$, whereas a higher average molecular weight may increase the $T_g$.

The particle size of the polymer particles is usually up to 1000 μm, preferably up to 500 μm, more preferably up to 250 μm, and in particular up to 150 μm. The particle size of the polymer particles usually ranges between 10 and 1000 nm, preferably between 30 and 300 nm, and in particular between 50 and 150 nm. The particle size is usually a mean particle size (z-average) of the polymer particles. It may be determined by dynamic light scattering (photon correlation spectroscopy) on a 0.01 percent by weight dispersion in water at 23° C.

The polymer particles are usually insoluble in water at 20° C.

The polymer particles may be used or prepared in the form of an aqueous dispersion of polymer particles. The solid contents of said dispersion may be from 20 to 80 wt %.

The polymer particles are usually essentially free of the pesticides. The term essentially free of pesticide refers to a concentration of less than 5 wt % with regard to the total mass of the polymer particle. In a preferred embodiment, the polymer particles contain less than 2 wt % and in a particularly preferred embodiment less than 0.1 wt % of the pesticides with regard to the total mass of the polymer particle.

The concentration of the pesticide in the polymer particles may be measured by separating the polymer particles from the aqueous dispersion by standard techniques known to the skilled person, such as centrifugation, and extraction of the pesticide from the isolated polymer particles with organic solvents, such as methanol, dichloromethane, acetone, or acetonitrile. Quantification of the pesticide in the extract may be achieved by HPLC analysis. The concentration may be calculated from the amounts of separated polymer particles and extracted pesticide.

Usually, the aqueous dispersion comprises from 0.1 to 20% by weight, preferably from 0.5 to 10% by weight, especially preferably from 0.5 to 7% by weight of the polymer particles, in each case based on the total weight of the aqueous dispersion.

In one form the aqueous dispersion comprises at least 5% by weight of the water-insoluble pesticide (e.g. solubility in water of up to 10 g/l), 0.1 to 20% by weight of the polymer particles, in each case based on the total weight of the aqueous dispersion, and where the polymer particles comprise from 0.1 to 10 wt % of monomer (I), at least 20 wt % of monomer (II), at least 20 wt % of monomer (III), from 0.1 to 10 wt % of monomer (IV) in polymerized form and where the weight ratio of the acrylamide to the acrylic acid is from 10:1 to 1:10.

In another form the aqueous dispersion comprises at least 10% by weight of the water-insoluble pesticide (solubility in water of up to 1 g/l), 0.5 to 10% by weight of the polymer particles, in each case based on the total weight of the aqueous dispersion, and where the polymer particles comprise from 0.5 to 5 wt % of monomer (I), at least 30 wt % of monomer (II), at least 40 wt % of monomer (III), from 0.5 to 2 wt % of monomer (IV) in polymerized form and where the weight ratio of the acrylamide to the acrylic acid is from 5:1 to 1:5.

In another form the aqueous dispersion comprises at least 20% by weight of the water-insoluble pesticide (solubility in water of up to 1 g/l), 0.5 to 7% by weight of the polymer particles, in each case based on the total weight of the aqueous dispersion, and where the polymer particles comprise from 0.5 to 5 wt % of monomer (I), at least 30 wt % of monomer (II), at least 40 wt % of monomer (III), from 0.5 to 2 wt % of monomer (IV) in polymerized form and where the weight ratio of the acrylamide to the acrylic acid is from 1:1 to 1:2.

The aqueous dispersion may comprise auxiliaries for agrochemical formulations. Examples for suitable auxiliaries are solid carriers or fillers, surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants, tackifiers and binders.

Suitable solid carriers or fillers are mineral earths, e.g. silicates, silica gels, talc, kaolins, limestone, lime, chalk, clays, dolomite, diatomaceous earth, bentonite, calcium sulfate, magnesium sulfate, magnesium oxide; polysaccharide powders, e.g. cellulose, starch; fertilizers, e.g. ammonium sulfate, ammonium phosphate, ammonium nitrate, ureas; products of vegetable origin, e.g. cereal meal, tree bark meal, wood meal, nutshell meal, and mixtures thereof.

Suitable surfactants are surface-active compounds, such as anionic, cationic, nonionic and amphoteric surfactants, block polymers, polyelectrolytes, and mixtures thereof. Such surfactants can be used as emulsifier, dispersant, solubilizer, wetter, penetration enhancer, protective colloid, or adjuvant. Examples of surfactants are listed in McCutcheon's, Vol. 1: Emulsifiers & Detergents, McCutcheon's Directories, Glen Rock, USA, 2008 (International Ed. or North American Ed.).

Suitable anionic surfactants are alkali, alkaline earth or ammonium salts of sulfonates, sulfates, phosphates, carboxylates, and mixtures thereof. Examples of sulfonates are alkylarylsulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

The aqueous dispersion preferably comprises an anionic surfactant. Preferred anionic surfactants are sulfonates, where sulfonates of condensed naphthalenes are more preferred. The aqueous dispersion may comprise from 0.1 to 12 wt %, preferably from 0.5 to 7 wt %, and in particular from 1 to 4 wt % of the anionic surfactant (e.g. the sulfonate).

Suitable nonionic surfactants are alkoxylates, N-substituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-substituted fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are home- or copolymers of vinylpyrrolidone, vinylalcohols, or vinylacetate.

Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide, or of the A-B—C type comprising alkanol, polyethylene oxide and polypropylene oxide.

Suitable adjuvants are compounds, which have a negligible or even no pesticidal activity themselves, and which improve the biological performance of the pesticide on the target. Examples are surfactants, mineral or vegetable oils, and other auxiliaries. Further examples are listed by Knowles, Adjuvants and additives, Agrow Reports DS256, T&F Informa UK, 2006, chapter 5.

Suitable thickeners are polysaccharides (e.g. xanthan gum, carboxymethylcellulose), anorganic clays (organically modified or unmodified), polycarboxylates, and silicates.

Suitable bactericides are bronopol and isothiazolinone derivatives such as alkylisothiazolinones and benzisothiazolinones.

Suitable anti-freezing agents are ethylene glycol, propylene glycol, urea and glycerin.

Suitable anti-foaming agents are silicones, long chain alcohols, and salts of fatty acids.

Suitable colorants (e.g. in red, blue, or green) are pigments of low water solubility and water-soluble dyes. Examples are inorganic colorants (e.g. iron oxide, titan oxide, iron hexacyanoferrate) and organic colorants (e.g. alizarin-, azo- and phthalocyanine colorants).

Suitable tackifiers or binders are polyvinylpyrrolidons, polyvinylacetates, polyvinyl alcohols, polyacrylates, biological or synthetic waxes, and cellulose ethers.

The aqueous dispersion may be employed for the purposes of treatment of plant propagation materials, particularly seeds. The compositions in question give, after two-to-tenfold dilution, active substance concentrations of from 0.01 to 60% by weight, preferably from 0.1 to 40% by weight, in the ready-to-use preparations. Application can be carried out before or during sowing. Methods for applying or treating the aqueous dispersion onto plant propagation material, especially seeds include dressing, coating, pelleting, dusting, soaking and in-furrow application methods of the propagation material. Preferably, the aqueous dispersion is applied on to the plant propagation material by a method such that germination is not induced, e. g. by seed dressing, pelleting, coating and dusting.

When employed in plant protection, the amounts of active substances applied are, depending on the kind of effect desired, from 0.001 to 2 kg per ha, preferably from 0.005 to 2 kg per ha, more preferably from 0.05 to 0.9 kg per ha, in particular from 0.1 to 0.75 kg per ha. In treatment of plant propagation materials such as seeds, e. g. by dusting, coating or drenching seed, amounts of active substance of from 0.1 to 1000 g, preferably from 1 to 1000 g, more preferably from 1 to 100 g and most preferably from 5 to 100 g, per 100 kilogram of plant propagation material (preferably seed) are generally required. When used in the protection of materials or stored products, the amount of active substance applied depends on the kind of application area and on the desired effect. Amounts customarily applied in the protection of materials are 0.001 g to 2 kg, preferably 0.005 g to 1 kg, of active substance per cubic meter of treated material.

Various types of oils, wetters, adjuvants, fertilizer, or micronutrients, and other pesticides (e.g. herbicides, insecticides, fungicides, growth regulators, safeners) may be added to the aqueous dispersion as premix or, if appropriate not until immediately prior to use (tank mix). These agents can be admixed with the aqueous dispersion according to the invention in a weight ratio of 1:100 to 100:1, preferably 1:10 to 10:1.

The user applies the aqueous dispersion or the tank mix prepared from the aqueous dispersion usually from a pre-dosage device, a knapsack sprayer, a spray tank, a spray plane, or an irrigation system. Usually, the aqueous dispersion is made up with water, buffer, and/or further auxiliaries to the desired application concentration and the ready-to-use spray liquor or the aqueous dispersion according to the invention is thus obtained. Usually, 20 to 2000 liters, preferably 50 to 400 liters, of the ready-to-use spray liquor are applied per hectare of agricultural useful area.

The present invention further relates to a method of preparing the aqueous dispersion by contacting water, the water-insoluble pesticide, and the polymer particles, and optionally the auxiliaries. The contacting may be achieved in a known manner, such as described by Mollet and Grubemann, Formulation technology, Wiley VCH, Weinheim, 2001; or Knowles, New developments in crop protection product formulation, Agrow Reports DS243, T&F Informa, London, 2005. Usually, the contacting is achieved by mixing (e.g. in a high shear mixer) at ambient temperatures (e.g. 10 to 40° C.).

The present invention further relates to a method of controlling phytopathogenic fungi and/or undesired plant growth and/or undesired insect or mite attack and/or for regulating the growth of plants, wherein the aqueous dispersion is allowed to act on the respective pests, their environment or the crop plants to be protected from the respective pest, on the soil and/or on undesired plants and/or on the crop plants and/or on their environment.

Examples of suitable crop plants are cereals, for example wheat, rye, barley, triticale, oats or rice; beet, for example sugar or fodder beet; pome fruit, stone fruit and soft fruit, for example apples, pears, plums, peaches, almonds, cherries, strawberries, raspberries, currants or gooseberries; legumes, for example beans, lentils, peas, lucerne or soybeans; oil crops, for example oilseed rape, mustard, olives, sunflowers, coconut, cacao, castor beans, oil palm, peanuts or soybeans; cucurbits, for example pumpkins/squash, cucumbers or melons; fiber crops, for example cotton, flax, hemp or jute; citrus fruit, for example oranges, lemons, grapefruit or tangerines; vegetable plants, for example spinach, lettuce, asparagus, cabbages, carrots, onions, tomatoes, potatoes, pumpkin/squash or capsicums; plants of the laurel family, for example avocados, cinnamon or camphor; energy crops and industrial feedstock crops, for example maize, soybeans, wheat, oilseed rape, sugar cane or oil palm; maize; tobacco; nuts; coffee; tea; bananas; wine (dessert grapes and grapes for vinification); hops; grass, for example turf; sweetleaf (*Stevia rebaudania*); rubber plants and forest plants, for example flowers, shrubs, deciduous trees and coniferous trees, and propagation material, for example seeds, and harvested produce of these plants.

The term crop plants also includes those plants which have been modified by breeding, mutagenesis or recombinant methods, including the biotechnological agricultural products which are on the market or in the process of being developed. Genetically modified plants are plants whose genetic material has been modified in a manner which does not occur under natural conditions by hybridizing, mutations or natural recombination (i.e. recombination of the genetic material). Here, one or more genes will, as a rule, be integrated into the genetic material of the plant in order to improve the plant's properties. Such recombinant modifications also comprise posttranslational modifications of proteins, oligo- or polypeptides, for example by means of glycosylation or binding polymers such as, for example, prenylated, acetylated or farnesylated residues or PEG residues.

The present invention further relates to seed containing the aqueous dispersion.

The advantages of the aqueous dispersion according to the invention are high storage stability, even at varying, high or low temperatures. In particular, no phase separation or agglomeration is observed during storage. Furthermore, the aqueous dispersions display a high stability upon dilution, thus enhancing the applicability for agrochemical purposes. Other advantages are the high rain fastness of the aqueous dispersion on crops plants, an increased biological efficacy of the aqueous dispersion and thus also a reduced amount of pesticides that is necessary to combat the respective pests.

The examples which follow illustrate the invention without imposing any limitation.

EXAMPLES

Polymer Particles A: Particle size (x50) 100 nm; $T_g$ 10° C.; monomer composition: 53 wt % butyl acrylate, 44 wt % methyl methacrylate, 0.9 wt % acrylic acid, 0.5 wt % acrylamide and 1.25 wt % of monomer (Ia), wherein $R^4$ is a $C_{10}$-$C_{14}$ alkyl, X is $SO_3Na$ and the index o is from 10 to 40.

Polymer Particles B: Particle size (x50) 100 nm; $T_g$ 10° C.; monomer composition: 53 wt % butyl acrylate, 43 wt % methyl methacrylate, 1.8 wt % acrylic acid, 1.0 wt % acrylamide and 1.25 wt % of monomer (Ia), wherein $R^4$ is a $C_{10}$-$C_{14}$ alkyl, X is $SO_3Na$ and the index o is from 10 to 40.

Comparative Particles C: Particle size (x50) 150 nm; $T_g$ 22° C.; monomer composition: 48 wt % butyl acrylate, 49 wt % methyl methacrylate, 1.8 wt % acrylic acid, 1.0% acrylamide.

Solvent A: Aromatic hydrocarbon, initial boiling point 231° C., flash point 105° C.

Surfactant A: $C_{18}$ fatty alcohol ethoxylate, 2-4 EO units per molecule.

Surfactant B: Ethoxylated castor oil, HLB value 14-15.

Surfactant C: $C_4$ alcohol ethoxylate, HBL value 16-18

Surfactant D: Ethoxylated and propoxylated $C_{12}$-$C_{18}$ alcohol alkoxylate.

Surfactant E: Block-copolymer of ethylene oxide and propylene oxide, HLB 12-18, average molecular weight 6500.

Thickener: Xanthan gum.

Wetting Agent: Sodium salt of naphthalene sulfonate condensate.

Antifoam: Silicon defoamer.

Biocide: Aqueous mix of 2-methyl-4-isothiazolin-3-one and 1,2-benzisothiazolin-3-one.

Example-1

Aqueous emulsions (AE1, AE2 and AE3) of emulsified alpha-cypermethrin, chlorfenapyr and pyraclostrobin were prepared by dissolving the respective pesticide in Solvent A. The aqueous phase comprising the other auxiliaries (Surfactants A, B, and/or C, Polymer Particles A, Antifoam and Propylene Glycol) was mixed with the oil phase and homogenized at 7000 rpm in a high shear mixer until the oil droplet size was less than 3 μm. Finally the Thickener and the Biocide was added under stirring. The final concentration of the components is given in Table 1.

TABLE 1

| AE1-AE3, concentrations are given in [wt %]. | | | |
|---|---|---|---|
| Ingredient | AE1 | AE2 | AE3 |
| Alpha-cypermethrin | 5 | — | — |
| Chlorfenapyr | — | 9.62 | — |
| Pyraclostrobin | — | — | 9.86 |
| Solvent A | 25 | 30 | 30 |
| Surfactant A | — | 0.5 | 0.5 |
| Surfactant B | — | 2 | 2 |
| Surfactant D | — | 10 | — |
| Polymer Particles A | 5 | 5 | 5 |
| Propylene Glycol | 6 | 6 | 6 |
| Antifoam | 0.4 | 0.4 | 0.4 |
| Thickener | 0.2 | 0.2 | 0.2 |
| Biocide | 0.4 | 0.4 | 0.4 |
| Water | to 100 | to 100 | to 100 |

Example-2

The storage stability of each of AE1 and AE2 was tested with a sample at 54° C. for two weeks, with another sample in a daily cycling temperature from −10° C. to +10° C. for two weeks, and yet with another sample at −10° C. for two weeks, respectively.

The storage stability of the AE3 was tested with a sample at 54° C. for two weeks, with another sample in a daily cycling temperature from −10° C. to +30° C. for two weeks, with another sample at 21° C. and yet with another sample at −10° C. for two weeks.

The emulsion stability was determined by visual observation of the samples. No noticeable phase separation occurred for all storage temperatures for samples AE1-AE3.

The oil droplet size was measured before and after storage by a Malvern® Mastersizer 2000. No droplet size increase was observed for samples AE1-AE3.

Example-3

Aqueous suspension AS1-AS4 of suspended alpha-cypermethrin, cyflumetofen and chlorfenapyr were prepared by mixing water, the respective pesticide, Wetting Agent, Antifoam, as well as Surfactant C in case of AS2 and Surfactant E in case of AS4. This mixture was wet-milled using a bead mill to a particle size around 2 μm. Propylene glycol, Biocide, Thickener, Polymer Particles B, as well as sodium dihydrogenphosphate and disodium hydrogenphosphate in case of AS2, were added and mixed resulting in a uniform suspension. The final concentration of the components is given in Table 2.

TABLE 2

AS1-AS4 concentrations are given in [wt %].

| Ingredient | AS1 | AS2 | AS3 | AS4 |
|---|---|---|---|---|
| Alpha-cypermethrin | 10 | — | — | — |
| Cyflumetofen | — | 28.1 | — | — |
| Chlorfenapyr | — | — | 17.89 | 41.7 |
| Propylene Glycol | 5 | 6 | 6 | 6.5 |
| Polymer Particles B | 5 | 5 | 5 | 5 |
| Wetting Agent | 2 | 4 | 2 | 1.6 |
| Surfactant C | — | 2 | — | — |
| Surfactant E | — | — | — | 3.5 |
| Sodium dihydrogen phosphate | — | 1 | — | — |
| Disodium hydrogen phosphate | — | 0.14 | — | — |
| Antifoam | 0.2 | 0.3 | 0.4 | — |
| Thickener | 0.2 | 0.2 | 0.4 | 0.13 |
| Biocide | 0.4 | 0.4 | 0.4 | 0.1 |
| Water | to 100 | to 100 | to 100 | to 100 |

Example-4

The storage stability of each of AS1-AS4 was tested with a sample at 40° C. for two weeks, with another sample in a daily cycling temperature from −10° C. to +10° C. for two weeks, and with another sample at −10° C. for two weeks, respectively.

The suspension stability was determined by visual observation of the samples. Neither noticeable phase separation nor hard caking occurred for samples AS1-AS4.

The particle size of the pesticide particles was determined before and after storage by Malvern Mastersizer 2000. No increase in particle size was found at all storage temperatures for samples AS1-AS4.

Example-5

A comparative aqueous emulsion C-AE3 of emulsified pyraclostrobin was prepared analogous to sample AE3 in Example-1 with the only difference that the Polymer Particles C were used instead of Polymer Particles A.

A lab rain fastness testing was made based on the following procedure: Samples were diluted by a specified rate. Ten times 1 μL drops were applied to the top of a corn leaf by a microliter syringe, and allowed to dry for 1 hour. Corn leaves were trimmed and placed in mesh baskets recessed inside a straight walled glass jar. Jars were spaced out in a rain chamber 50 cm under a XR 8006 nozzle. The sprayer was moved along at 0.5 mph for approximately 60 cycles, until 2 cm of rain had been collected in a rain gauge. The rain wash was partitioned with 10.0 mL of hexane, shaken vigorously and allowed to separate out again for several hours. 100 μL of organic phase was collected and transferred to a HPLC vial, and allowed to evaporate to dryness. The residue was reconstituted with 1.0 mL of acetonitrile, mixed, and then submitted for analysis by H PLC-MS/MS. The results were summarized in Table 4. The results showed an increased rain fastness of sample AE3 compared to C-AE3.

TABLE 3

Lab rain fastness testing results

| Sample | % Pyraclostrobin remaining on corn leaf after simulated rain |
|---|---|
| AE3 | 70% |
| C-AE3 | 28% |

Example-6

Comparative aqueous suspension C-AS2 and C-AS4 of suspended cyflumetofen and chlorfenapyr were prepared analogous to the samples AS2 and AS4 in Example-1, respectively, with the only difference that the Polymer Particles C were used instead of Polymer Particles A.

The stability upon dilution of samples AS2 and C-AS2 was evaluated by a laboratory experiment. A 2 liter vessel with a cooling device and a paddle stirrer was connected to a pump and a sieve module equipped with a 300 μm and a 150 μm sieve. A volume of 2 liters of CIPAC water D was filled into the flask, which was kept at a temperature of 20° C. A volume of 30 ml of the samples AS2 and C-AS2 was added into separate flasks and the slurry was pumped at 100 l/h for one hour. Subsequently, 1700 ml of the mixture were pumped out, leaving a remaining quantity of 330 ml in the tank. This procedure was repeated four times. After the fourth replication and 2 hours recirculation time the mixture in the equipment was subjected to a standing time of 14 to 18 hours overnight. The next morning the mixture was recirculated for one hour, followed by a fifth refill and 5 hours recirculation.

After this final circulation the sieves were evaluated for covering. The testing procedure was stopped, if the sieves were blocked and/or the flow rate decreased to zero. The results were summarized in table 4.

TABLE 4

Stability upon dilution of samples AS2 and C-AS2.

| Sample | Flow rate |
|---|---|
| AS2 | Maintained 89% flow after $5^{th}$ filling |
| C-AS2 | Flow stopped in 1 min ($1^{st}$ filling) |

The results clearly confirmed that AS2 displayed a significantly enhanced stability upon dilution compared to C-AS2.

The stability upon dilution of samples AS4 and C-AS4 was evaluated accordingly. In this testing, however, 200 ml of the samples were added to 2 L CIPAC D water the slurry was not exchanged through-out the testing. The suspension slurry was then pumped for 3 hours through a sieve module (300 μm and 150 μm sieve width) and left overnight. Subsequently, the pump was restarted and the final flow rate was recorded. The results were summarized in table 5.

TABLE 5

Stability upon dilution of samples AS4 and C-AS4.

| Sample | Flow rate |
|---|---|
| AS4 | Maintained 100% flow rate |
| C-AS4 | Maintained 12% flow rate |

The results clearly confirmed that AS4 displayed a significantly enhanced stability upon dilution compared to C-AS4.

The invention claimed is:

1. An aqueous dispersion comprising:
water as an aqueous continuous phase, the water being present in an amount from 20% to 85% by weight based on the total weight of the aqueous dispersion;
a water-insoluble pesticide in the form of at least one of pesticide particles and emulsified droplets which are homogeneously suspended or emulsified in the aqueous continuous phase, the pesticide being present in an amount of at least 5% by weight based on the total weight of the aqueous dispersion; and
polymer particles which are homogeneously suspended in the aqueous continuous phase, the polymer particles being present in an amount from 0.1% to 20% by weight based on the total weight of the aqueous dispersion, the polymer particles comprising monomers in polymerized form, wherein the monomers comprise:
(I) 0.1 to 20 wt. % of an alkoxylated copolymerizable surfactant according to formula (Ia) based on the total weight of the monomers:

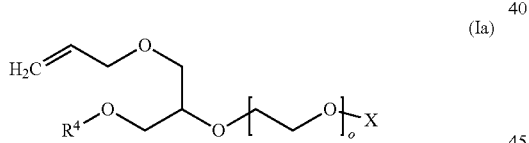

(Ia)

(II) at least 20 wt % of a $C_2$-$C_6$ alkyl (meth)acrylate based on the total weight of the monomers, and
(III) at least 20 wt. % of methyl (meth)acrylate based on the total weight of the monomers;
wherein:
$R^4$ is $C_9$-$C_{15}$ alkyl or $C_7$-$C_{11}$ alkyl-phenyl,
X is H or $SO_3^-$, and
the index o is from 3 to 50.

2. The aqueous dispersion of claim 1, wherein:
the monomers of the polymer particles comprise:
(I) 0.1-20 wt. % of the alkoxylated copolymerizable surfactant,
(II) at least 30 wt. % of the $C_2$-$C_6$ alkyl (meth)acrylate, and
(III) at least 30 wt. % of the methyl (meth)acrylate, and
the monomers of the polymer particles further comprise:
(IV) 0.1-10 wt. % of (meth)acrylamide and (meth) acrylic acid in a weight ratio from 5:1 to 1:5.

3. The aqueous dispersion of claim 1, where the polymer particles have a glass transition temperature from 0° C. to 20° C.

4. The aqueous dispersion of claim 1, where the particle size of the polymer particles is up to 250 μm.

5. The aqueous dispersion of claim 1, where the $C_2$-$C_6$ alkyl (meth)acrylate is butyl acrylate.

6. The aqueous dispersion of claim 1, further comprising a water-immiscible solvent that contains the pesticide in dissolved form.

7. The aqueous dispersion of claim 1, wherein $R^4$ is $C_{10}$-$C_{14}$ alkyl, X is $SO_3^-$, and the index o is from 5 to 15.

8. The aqueous dispersion of claim 1, wherein the concentration of pesticide in the polymer particles is lower than 5 wt % with regard to the total mass of the polymer particles.

9. A method of preparing the aqueous dispersion as defined in claim 1, by contacting water, the water-insoluble pesticide, and the polymer particles.

10. A method of controlling phytopathogenic fungi and/or undesired plant growth and/or undesired insect or mite attack and/or for regulating the growth of plants, the method comprising:
contacting the aqueous dispersion of claim 1 with, and allowing the aqueous dispersion to act on, one or more of pests selected from the group consisting of phytopathogenic fungi undesired plants, insects, mites, and combinations thereof, an environment of the pests, crop plants to be protected from the pests, soil in the environment, undesired plants in the environment, and crop plants in the environment.

11. The method of claim 9, where the monomers of the polymer particles further comprise (meth)acrylamide and (meth)acrylic acid in a weight ratio from 5:1 to 1:5 in polymerized form.

12. The method of claim 9, where the polymer particles have a glass transition temperature from 0° C. to 20° C.

13. The method of claim 9, where the $C_2$-$C_6$ alkyl (meth) acrylate is butyl acrylate.

14. The aqueous dispersion of claim 1, wherein:
the water is present in an amount from 35% to 75% by weight based on the total weight of the aqueous dispersion;
the pesticide is present in an amount from 5% to 42% by weight based on the total weight of the aqueous dispersion; and
the polymer particles are present in an amount from 0.5% to 7% by weight based on the total weight of the aqueous dispersion.

15. The aqueous dispersion of claim 14, wherein:
the aqueous dispersion remains stable upon storage for two weeks with a daily cycling of temperature of −10° C. to +10° C. without visually observable phase separation.

16. The aqueous dispersion of claim 14, wherein:
the monomers of the polymer particles comprise:
(I) 0.5-5 wt. % of the alkoxylated copolymerizable surfactant,
(II) at least 30 wt. % of the $C_2$-$C_6$ alkyl (meth)acrylate, and
(III) at least 40 wt. % of the methyl (meth)acrylate, and
the monomers of the polymer particles further comprise:
(IV) 0.5-5 wt. % of (meth)acrylamide and (meth) acrylic acid.

17. The aqueous dispersion of claim 16, wherein the aqueous dispersion remains stable upon dilution with water in a volumetric ratio of 1:66.7 for aqueous dispersion: diluting water.

18. The aqueous dispersion of claim 16, wherein:
the $C_2$-$C_6$ alkyl (meth)acrylate is butyl acrylate; and
in formula (Ia), $R^4$ is $C_{10}$-$C_{14}$ alkyl, X is $SO_3^-$, and the index o is from 5 to 15.

19. The aqueous dispersion of claim 18, wherein:
the monomers of the polymer particles comprise 1.25-5 wt. % of the alkoxylated copolymerizable surfactant; and
the polymer particles are present in an amount from 0.5% to 5% by weight based on the total weight of the aqueous dispersion.

20. The aqueous dispersion of claim 19, wherein:
the aqueous dispersion remains stable upon dilution with water in a volumetric ratio in a range of 1:10 to 1:66.7 for aqueous dispersion:diluting water such that a diluted suspension maintains at least 89% of its flow rate after being initially pumped at 100 l/hr through 300-μm and 150-μm sieves, being allowed to stand for 18 hr, and then being pumped again through the 300-μm and 150-μm sieves; and
the aqueous dispersion remains stable upon storage for two weeks at a temperature of −21° C. without visually observable phase separation.

\* \* \* \* \*